United States Patent
Smith et al.

(10) Patent No.: US 6,789,183 B1
(45) Date of Patent: Sep. 7, 2004

(54) APPARATUS AND METHOD FOR ACTIVATION OF A DIGITAL SIGNAL PROCESSOR IN AN IDLE MODE FOR INTERPROCESSOR TRANSFER OF SIGNAL GROUPS IN A DIGITAL SIGNAL PROCESSING UNIT

(75) Inventors: Patrick J. Smith, Houston, TX (US); Jason A. Jones, Houston, TX (US); Kevin A. McGonagle, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 715 days.

(21) Appl. No.: 09/670,664

(22) Filed: Sep. 27, 2000

Related U.S. Application Data

(60) Provisional application No. 60/156,626, filed on Sep. 28, 1999.

(51) Int. Cl.$^7$ ............................................... G06F 13/28
(52) U.S. Cl. .......................................... 712/32; 712/35
(58) Field of Search .............................. 712/32, 33, 34, 712/35, 43; 711/111, 112; 710/22, 23, 24, 26

(56) References Cited

U.S. PATENT DOCUMENTS

| | | | |
|---|---|---|---|
| 5,099,417 A | * 3/1992 | Magar et al. | .................. 710/27 |
| 5,608,889 A | * 3/1997 | Werlinger et al. | .......... 711/217 |
| 5,611,075 A | * 3/1997 | Garde | .......................... 711/153 |
| 5,634,076 A | * 5/1997 | Garde et al. | .................... 710/22 |
| 5,765,025 A | * 6/1998 | Morimoto et al. | ............. 710/23 |
| 5,787,497 A | * 7/1998 | Tokura et al. | ............... 711/220 |
| 5,826,106 A | * 10/1998 | Pang | ............................ 710/25 |
| 6,163,836 A | * 12/2000 | Dowling | ...................... 712/37 |
| 6,167,465 A | * 12/2000 | Parvin et al. | .................. 710/22 |
| 6,256,724 B1 | * 7/2001 | Hocevar et al. | ............... 712/35 |
| 6,298,366 B1 | * 10/2001 | Gatherer et al. | ............ 708/523 |

* cited by examiner

Primary Examiner—Henry W. H. Tsai
(74) Attorney, Agent, or Firm—William W. Holloway; W. James Brady; Frederick J. Telecky, Jr.

(57) ABSTRACT

In a digital processing unit having a plurality of digital signal processors, a first digital signal processor can request a direct transfer of a signal group stored in the memory unit of a second digital signal processor. In order to insure that the second digital signal is active, a control signal is generated by the direct memory access controller of the first digital signal processor. The control signal is applied the directly to the memory access controller of the second digital signal processor. When the second digital signal processor is in an IDLE mode, the control signal activates the second digital signal processor.

12 Claims, 5 Drawing Sheets

APPARATUS AND METHOD FOR ACTIVATION OF A DIGITAL SIGNAL PROCESSOR IN AN IDLE MODE FOR INTERPROCESSOR TRANSFER OF SIGNAL GROUPS IN A DIGITAL SIGNAL PROCESSING UNIT

This application claims the benefit of U.S. Provisional Application No. 60/156,626, filed Sep. 28, 1999.

RELATED APPLICATIONS

U.S. Patent Application Serial No. 09/670,663; APPARATUS AND METHOD FOR THE TRANSFER OF SIGNAL GROUPS BETWEEN DIGITAL SIGNAL PROCESSORS IN A DIGITAL SIGNAL PROCESSING UNIT; invented by Patrick J. Smith, Jason A. Jones and Kevin A. McGonagle; filed on even date herewith; and assigned to the assignee of the present application: U.S. Patent Application Serial No. 09/670,665; APPARATUS AND METHOD FOR A HOST PROCESSOR INTERFACE UNIT IN A DIGITAL SIGNAL PROCESSING UNIT; invented by Patrick J. Smith, and Jason A. Jones; filed on even date herewith; and assigned to the assignee of the present invention. U.S. Patent Application Serial No. 09/670,666; APPARATUS AND METHOD FOR THE EXCHANGE OF SIGNAL GROUPS BETWEEN A PLURALITY COMPONENTS AND A DIRECT MEMORY ACCESS CONTROLLER IN A DIGITAL SIGNAL PROCESSSOR; invented by Patrick J Smith, Jason A. Jones, Kevin A. McGonagle, and Tai H. Nguyen; filed on even date herewith; and assigned to the assignee of the present application. U.S. Patent Application Serial No. 09/670,667; APPARATUS AND METHOD FOR A SORTING MODE IN A DIRECT MEMORY ACCESS CONTROLLER OF A DIGITAL SIGNAL PROCESSOR; invented by Patrick J. Smith and Tai H. Nguyen; filed on even date herewith; and assigned to the assignee of the present application: and U.S. Patent Application Serial No. 09/670,668; APPARATUS AND METHOD FOR ADDRESS MODIFICATION IN A DIRECT MEMORY ACCESS CONTROLLER; invented by Patrick J. Smith; filed on even date herewith; and assigned to the assignee of the present application are related applications.

BACKGROUND OF THE INVENTION

1. Field of the Invention

This invention relates generally to the data processing apparatus and, more particularly, to the specialized high performance processors generally referred to as digital signal processing units. This invention relates specifically to the reduction of energy in digital signal processing units that have a plurality of digital signal processors, the digital signal processors having the further property that signal groups can directly exchanged therebetween.

2. Background of the Invention

As the need for increasing computation power has been recognized, part of the response to this need has been the incorporation of more than one digital signal processors in a digital signal processing unit. Referring to FIG. 1, a digital signal processing unit 1 having two digital signal processors, according to the prior art, is shown. A first digital signal processor 10 includes a core processing unit 12 (frequently referred to as a processing core), a direct memory access unit 14, a memory unit or memory units 16, and a serial port or serial ports 18. The memory unit 16 stores the signal groups that are to be processed or that assist in the processing of the signal groups to be processed by the core processing unit 12. The core processing unit 12 performs the bulk of the processing of signal groups in the memory unit. The direct memory access unit 14 is coupled to the core processing unit 12 and to memory unit 16 and mediates the signal group exchange therebetween. The serial port 18 exchanges signal groups with components external to the digital signal processing unit 1. The core processing unit 12 is coupled to the serial port 18 and to the memory unit 16 and controls the exchange of signal groups between these components. FIG. 1 also includes a second digital signal processor 10'. The second digital signal processor 10' is a replica of the first digital signal processor 10 and includes a core processing unit 12', a direct memory access unit 14', a memory unit 16', and a serial port 18'. The functionality and inter-relationships of the components of the digital signal processors 10 and 10' is the same.

The digital signal processor is typically designed and implemented to have limited functionality, but functions that must be repeated and performed rapidly. The fast fourier transform (FFT) calculation and the Viterbi algorithm decoding are two examples where digital signal processors have been utilized with great advantage. To insure that the digital signal processors operate with high efficiency, the core processing is generally optimized for the performance of the limited functionality. Part of the optimization process involves the off-loading, to the extent possible, any processing not directed toward the optimized function. Similarly, the exchange of signal groups involving the core processing unit and the memory unit has been assigned to the direct memory access controller.

In addition, many of the applications for which the digital signal processing units are the best candidates are also applications in which low power consumption is of high importance, e.g. cell phones, pagers, etc. However, for a variety of reasons such as the increased computational load, the inclusion of plurality of digital signal processors in a single digital signal processing unit has become increasingly important. As will be clear, the inclusion of a plurality of digital signal processors in a single digital signal processing unit has the effect of increasing the power consumption of the unit.

In the past, portions of the digital signal processor could be placed in an IDLE mode. In this mode of operation, the clock signal is removed from all or part of the digital signal processor. Because in the absence of a clock signal, the apparatus remains in a low energy mode until the clock signal is reapplied.

Referring to FIG. 2A, the block diagram of a digital signal processors 10, 10' capable of implementing an IDLE mode of operation, according to the prior art, is shown. The core processing unit 12, 12', the direct memory access controller 14, 14', the memory unit 16, 16' and the serial port 18, 18', have the same relationship in the digital signal processor 10, 10' as in FIG. 1. In addition, an external clock signal is applied to a clock buffer unit 21, 21'. The clock buffer unit can include a phase-locked loop (not shown). A clock signal from the clock buffer unit 21, 21' is applied to the core processing unit 12, 12'. In particular, the clock signal is applied to a clock control unit 121, 121' of the core processing unit 12, 12'. From the clock control units 121, 121', a clock signal is transmitted to the direct memory access controller 14, 14' and to the serial port.18, 18'. From the direct memory access controller 14, 14', the clock signals are distributed to the memory unit 16, 16'. (Note the distribution of clock signals described here is meant to be illustrative. Other systems of the distribution of clock signals will be clear to those familiar with digital signal processors.) As will be clear to those skilled in the art, the presence of clock signals is necessary for the operation of the digital signal processor and each of components thereof. In the absence of clock signal, the apparatus of the digital signal processor remains in IDLE state, a state of the processing apparatus that consumes a reduced amount of power in the absence of clock signals. It is desirable feature of digital signal processing units for certain application that the processing apparatus be in the IDLE mode when ever the signal groups are not being manipulated.

Referring next to FIG. 2B, the operation of the clock controller unit 121 of the core processing unit 12 is illustrated. The clock signal from the clock buffer unit 21 is applied to a first input terminal of logic AND gate 124 and to a first input terminal of logic AND gate 125. A second input terminal of logic AND gate 124 is coupled to an output terminal of latch unit 122, while the second input of logic AND gate 125 is coupled to an output terminal of latch unit 123. The latch units 122 and 123 receive external control signals on first input terminals. The external control signals set and maintain a positive logic signal at the output of the latch units 122 and 123. An IDLE signal 0 and IDLE signal 1 are applied to the second input terminals of latch unit 122 and latch unit 123, respectively. The IDLE signal 0 and the IDLE signal 1 remove the positive latch signal from the output terminals of the latch units to which they are applied. The operation of the clock control unit 121 can be understood as follows. When the latch units 122 and 123 are set, a positive logic signal is applied to an input terminal of logic AND gate 124 and the input terminal of logic AND gate 125 respectively. The presence of a positive logic signal on one input terminal of logic AND gate 124 and one input terminal of logic AND gate 125 results in the clock signal being applied to the output terminal of logic AND gates 124 and 125, respectively. The logic AND gate 124 applies a clock signal to the core processing unit 12 while the logic AND gate 125 applies a clock signal to the remainder of the digital signal processor. The positive signals at the output of the latch units 122 and 123 are the result of an application of control signals to the set input terminal of the latch units. The external control signal indicates that need for the processing activity (and hence the application of the clock signal) by at least portion of the digital signal processor 10. For example, when signal groups are applied to the serial port 18 of the digital signal processor, the serial port 18 and the core processing unit 12 be activated if these components are in an IDLE mode. Consequently, the application of signal groups to the serial port 18 results in an external control signal being applied to both latch unit 122 of the clock control unit 121. Once the external control signal has been applied, the out put signals of the latch units 123 and 124 are set and the clock signals will continue to be distributed throughout the portions of the digital signal processor 10. Within the core processing unit 12, software algorithms determine when an IDLE signal should be generated. For example, when the core processing unit has not been active for a predetermined period of time, a time-out register can generate an IDLE signal that is applied to the clear terminal of latch unit 122. The IDLE signal applied to the clear terminal of the latch unit 122 will remove the positive signal from the output terminal of the latch unit 122 and prevent the clock signal from being transmitted by the clock unit. The clock signal that is applied to the direct memory interface controller 14 by logic AND gate 125 is generated in a similar manner.

As will be clear to those familiar with digital signal processing units, the foregoing is a very general description of the apparatus for providing a IDLE mode of operation and for providing a wake-up signal returning to the active mode. The implementation of IDLE mode can be more complex. For example, particular components, such as the memory unit can be placed independently placed in an IDLE mode.

Recently, a digital signal processing unit with a plurality of (independently operating) digital signal processors has be provided with apparatus that permits the transfer of signal groups for one digital signal processor to a second digital signal processor without the signal groups leaving the digital signal processing unit (cf. APPARATUS AND METHOD FOR THE TRANSFER OF SIGNAL GROUPS BETWEEN DIGITAL SIGNAL PROCESSORS IN A DIGITAL SIGNAL PROCESSING UNIT cited above). With this capability, the possibility can arise that one of the digital signal processors (which are operating independently) involved in the signal group transfer will either be in an IDLE mode or will enter an IDLE mode during the transfer. Either situation can result in an inefficient signal group transfer or in a incorrect signal transfer. The digital signal processors could be constantly maintained in an ACTIVE mode to prevent problems in the processor-to-processor transfer of signal groups, but such a solution would not be energy efficient.

A need has therefore been felt for apparatus and an associated method having the feature that the power consumption in a digital signal processing unit having a plurality of digital signal processors can be reduced while permitting the exchange of signal groups between the digital signal processors in an uninterrupted manner. It would be further feature of the apparatus and associated method that the digital signal processor requiring the signal groups stored in the other digital signal processor can insure that the digital signal processor storing the requisite signal groups is not in the IDLE mode. Similarly, it would be a still further feature of the present invention to insure that neither digital signal processor entered an IDLE mode during the transfer of the signal groups.

SUMMARY OF THE INVENTION

The aforementioned and other features can be accomplished, according to the present invention, by providing each digital signal processor of a digital signal processing unit with apparatus for generating a clock-on control signal. Each digital signal processor is provided with apparatus for insuring that a digital signal processor receiving the clock-on signal is not in an IDLE mode of operation. Conducting paths are provided between the digital signal processors to permit one digital processor to wake-up (i.e., change from an IDLE mode to an ACTIVE mode of operation) a second processor. The present invention finds applicability in a digital signal processor-to-digital signal processor transfer of signal groups wherein the digital signal processor having the signal groups required by the second digital signal processor is in the IDLE mode when stored signal groups are needed.

DESCRIPTION OF THE PREFERRED EMBODIMENTS

1. Detailed Description of the Figures

Figure 1:
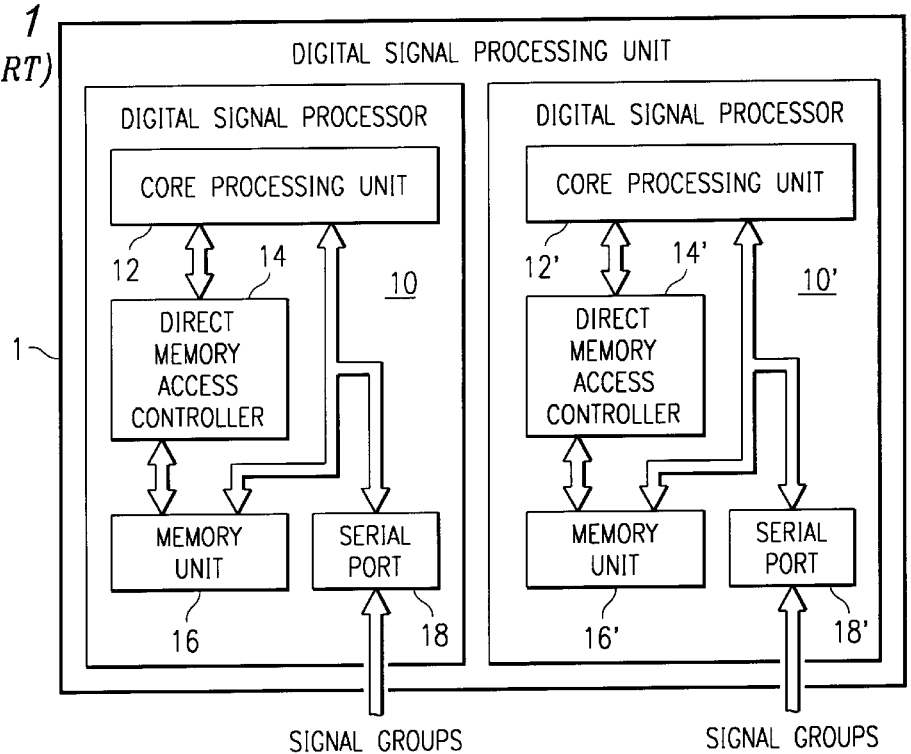
FIG. 1 is a block diagram of a digital signal processing unit according to the prior art.
Figure 2B:
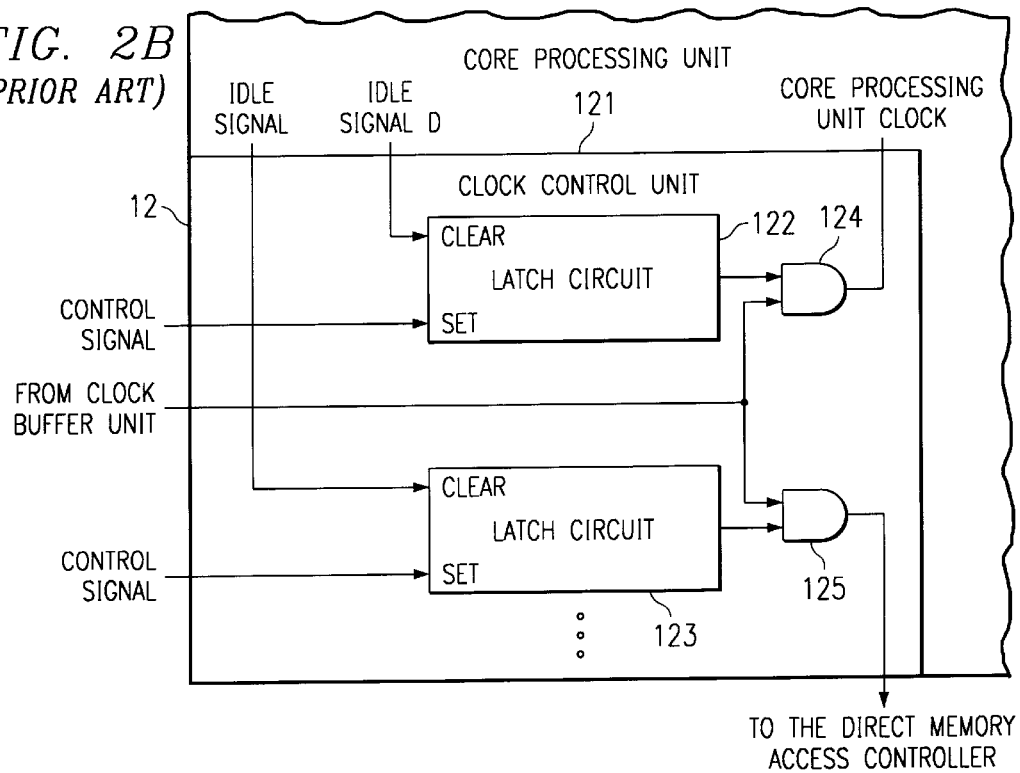
FIG. 2A is a block diagram illustrating the apparatus used to place a digital signal processor or portions thereof into and out of an IDLE mode according to the prior art, while FIG. 2B provides additional detail of clock control unit according to the prior art.
Figure 2A:
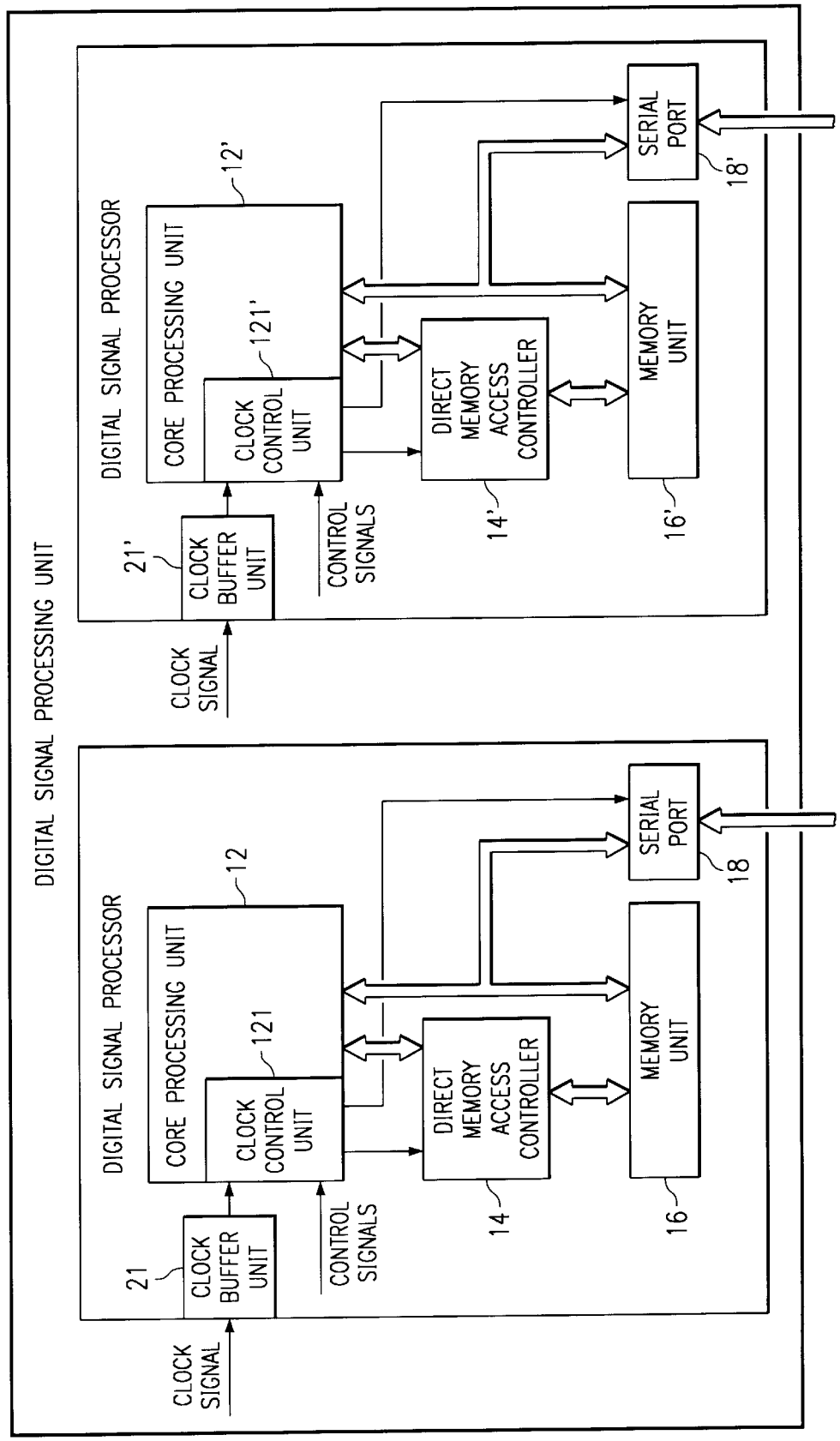

FIGS. 1, 2A, and 2B, have been discussed with respect to the background of the invention.

Figure 3:
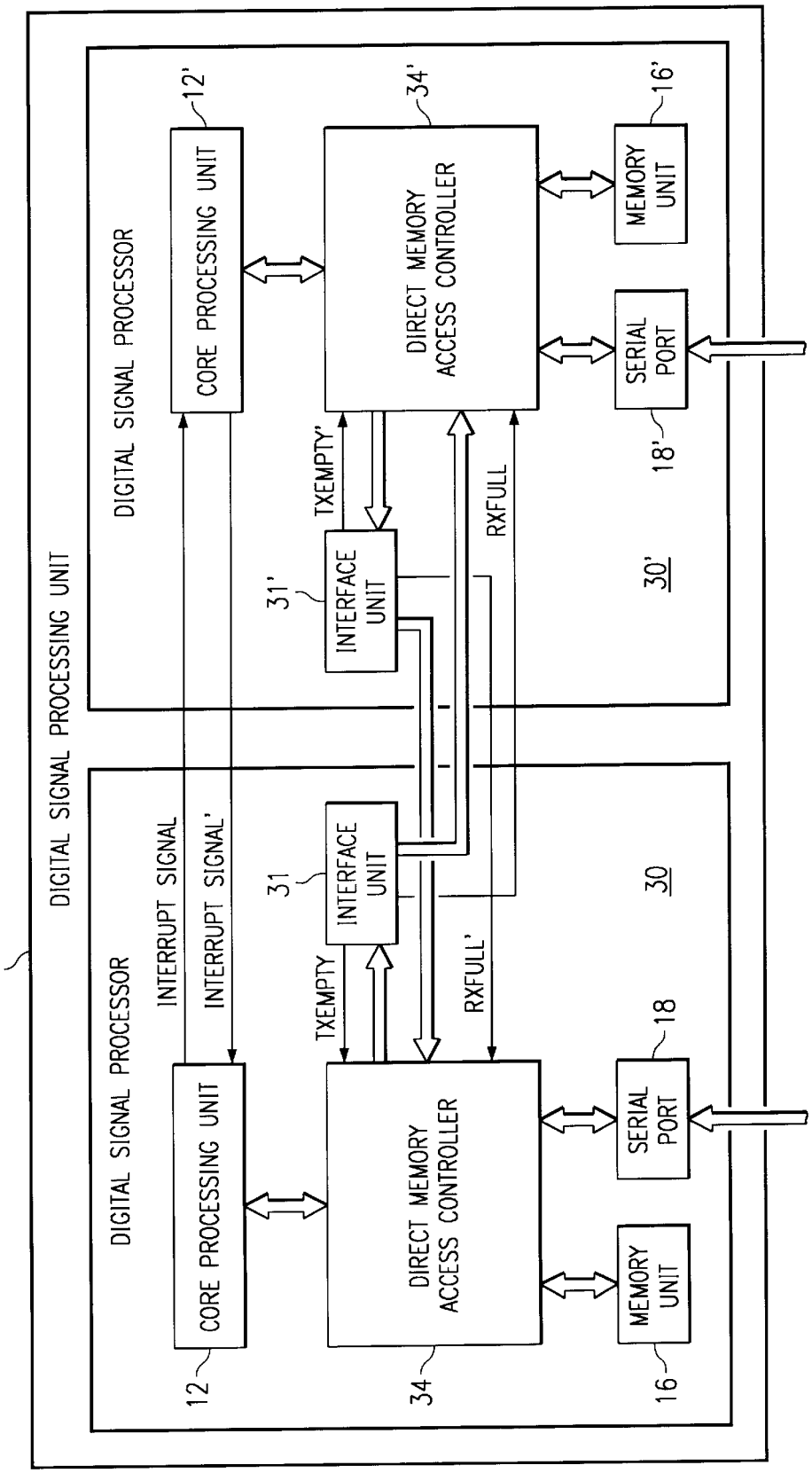
FIG. 3 is a block diagram of the digital signal processing unit capable of a digital signal processor-to-digital signal processor exchange of signal groups within a digital signal processing unit is illustrated.

Referring to FIG. 3, a digital signal processing unit 3 having two digital signal processors 30 and 30' and capable of digital signal processor-to-digital signal processor signal transfer is shown. Each digital signal processing unit 30 and 30' now includes an interface unit 31 and 31' respectively. Each interface unit 31 and 31' is coupled to and can receive signal groups from the direct memory access controller 34 and 34', respectively. Each interface unit 31 and 31' can apply a control signal, TXEMPTY, to the coupled direct memory access unit 34 and 34', respectively. The TXEMPTY signal indicates that the interface unit 31, 31' generating this signal is ready to receive signal groups from the coupled direct memory access unit 34, 34'. Each interface unit 31 and 31' is coupled to a conducting path for applying signal groups from the digital signal processor 30 and 30', in which the interface unit is located, to the direct memory access unit 34' and 34, located in the other digital signal processor, i.e., 31' and 31, respectively. In addition, each interface unit 31 and 31+ can generate a control signal, RXFULL and RXFULL'. The RXFULL and RXFULL' control signals are applied to direct memory access unit 34' and 34, respectively, of the digital signal processor 30 and 30' that does not include the interface unit generating the control signal. The RXFULL and RXFULL signals indicate that the interface unit is ready to transmit signal groups stored therein to the other digital signal processor.

Each digital signal processor can also generate an INTERRUPT control signal and apply the INTERRUPT signal to the other digital signal processor. The purpose of this INTERRUPT signal, in the present invention, is to provide a mechanism for initiating the transfer of signal groups between processing units.

Figure 4:
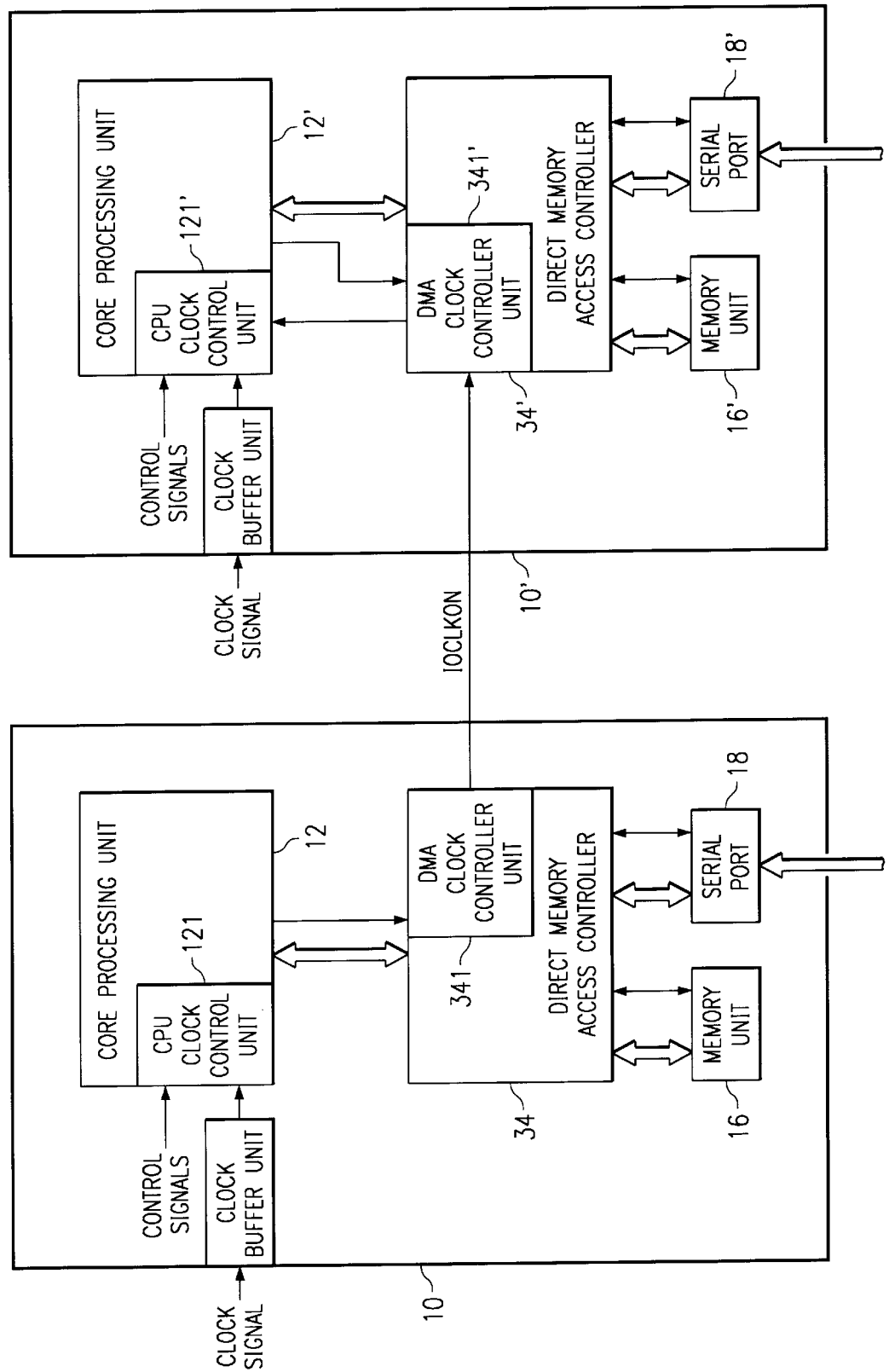
FIG. 4 is a block diagram illustrating the apparatus used to place one or more digital signal processors of a digital signal processing unit, capable of exchanging signal groups, into and out of an IDLE mode according to the present invention.

Referring next to FIG. 4, FIG. 3 has been reproduced with the addition of the control signal paths necessary to implement the present invention. To avoid complexity. The interface units 31 and 31' and the related signal paths have been removed. In particular, a region of the direct memory access controller 34, 34' has been designated as a dma clock controller unit 341, 341'. In FIG. 4, the assumption is made that the digital signal processor 10 requires signal groups that are stored in the digital signal processor 10'. The dma clock controller unit 341, when the core processing unit 12 indicates a requirement for a signal group stored in memory unit 16' of digital signal processor 10', generates a first control signal, the IOCLKON signal, and applies this first control signal to the dma clock control unit 341'. The dma clock control unit 341' generates a second control signal, DMACLKON, that is applied to the core processing unit clock control unit 121'. The DMACLKON signal insures that, if the digital signal processor 10' is initially in an IDLE mode of the operation, the digital signal processor 10' will enter an ACTIVE mode of operation, i.e., the clock signal will be applied to the core processing unit 12'.

Figure 5A:
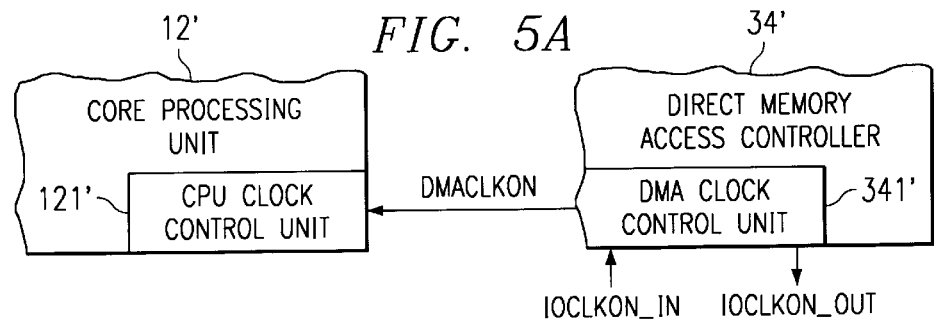
FIG. 5A illustrates the relationship between the control signals of a digital signal processor for activating a second digital signal processor according to the present invention.

Referring to FIG. 5A, the relationship of the control signals is illustrated. The direct memory access controller 34' includes the dma clock control unit 341'. In response to conditions within the direct memory access controller 34', the dma clock control unit 341' generates the IOCLKON_OUT control signal. This IOCLKON_OUT control signal is applied to the dma clock control unit of another digital signal processor (34). When the IOCLKON_OUT control signal is an input signal to the other dma clock control unit, the control signal is labeled as an IOCLKON_IN control signal.

Figure 5B:
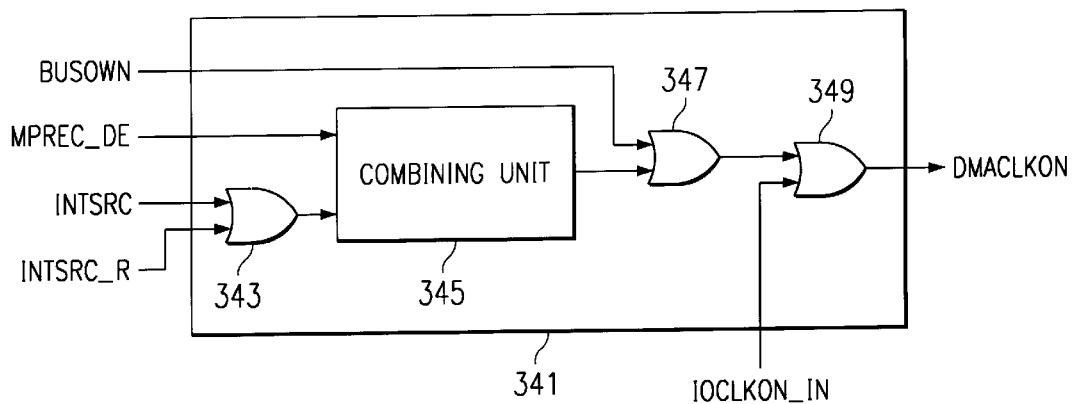
FIG. 5B illustrates the conditions for the generation of the signal activating the core processing unit.

Referring to FIG. 5B, the generation of the DMACLKON signal shown in FIG. 5A, is illustrated. An INTSRC signal and an INTSRC_R signal are applied to input terminals of logic OR gate 343. The INTSRC signal is provided when a synchronous event occurs in the direct memory access controller 34. The INTSRC_R signal is provided when the INSTSRC signal is captured and stored in register. In either event, a synchronous event has occurred. The output signal of logic OR gate 343 is applied to combining unit 345. Also applied to combining unit 345 is an MPREC_DE signal. The MPREC_DE signal is generated when a channel in the direct memory access controller is enabled. The output signal of combining unit 345 is applied to an input terminal of logic OR gate 347. A BUSOWN signal is applied to a second input terminal of logic OR gate 347. The BUSOWN signal is generated as the result of implementing a transaction. This signal indicates that dma bus has been assigned to a requesting process. The output signal of logic OR gate 347 is applied to a first input terminal of logic OR gate 349. The first input terminal of logic OR gate 349 has the IOCLKON_IN signal applied thereto. The IOCLKON_IN signal is generated by the digital processing unit requiring signal groups stored in the digital signal processor associated with direct memory access controller 34. The out put signal of logic OR gate 349 is the DMACLKON signal, the signal that is applied to the clock control unit of the core processing unit in FIG. 5A.

Figure 5C:
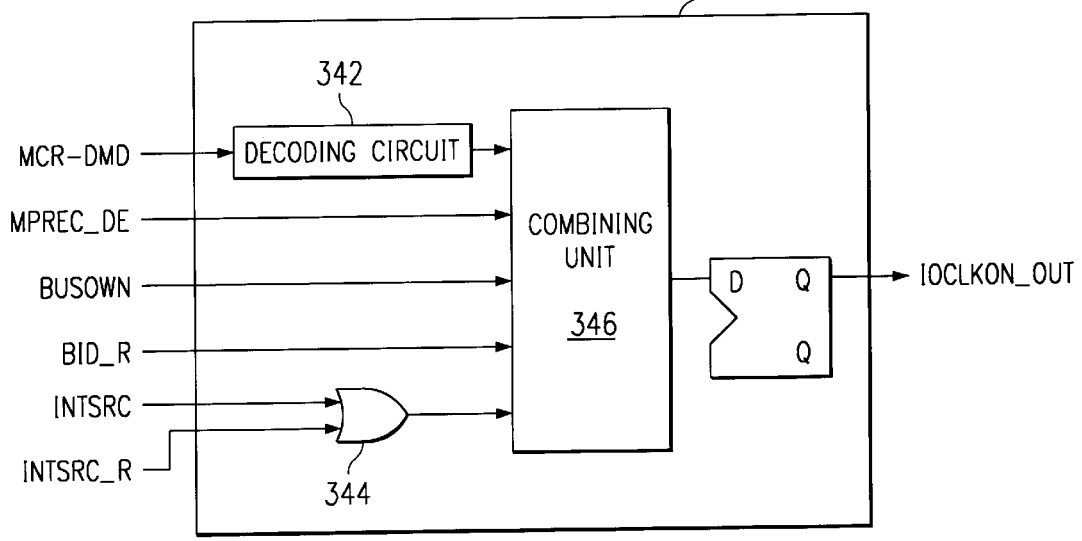
FIG. 5C illustrates the conditions for the generation of the signal that is forwarded to a second digital signal processing unit to insure that the second digital signal processing unit is activated.

Referring to FIG. 5C, the conditions for the generation of the IOCLKON_OUT signal by the clock control unit 341 of the direct memory access unit is shown. The MCR_DMD signal, a program signal, is applied to the decoding circuit 342 and when the program signal is identified as a digital signal processor-to-digital signal processor signal group transfer signal, a signal is applied to combining unit 346. The combining unit 346 also has the MPREC_DE signal, the BUSOWN signal, and the BID_R signal applied to input terminal thereof. The INTSRC signal and the INTSRC_R signal are applied to a logic OR unit 344 and the output signal of the logic OR unit is applied to an input terminal of combining unit 346. The MPREC_DE signal, the BUSOWN signal, the INTSRC and the INTSRC_R signals have been described with respect to FIG. 5B. The BID_R signal is a signal indicating that a channel in the direct memory access controller has been programmed for the next transfer. The output signal of the combining unit 346 is applied to the D-terminal of a D type flip-flop circuit 348. The Q-terminal of the D-type flip-flop provides the IOCLKON_OUT signal for application to a second digital signal processor.

2. Operation of the Preferred Embodiments

The present invention is most advantageously used in a digital signal processing unit having a plurality of digital signal processors and in which the digital signal processors can have an inter-processor exchange of signal groups. In particular, a first digital signal processing unit can require a signal group in a second digital signal processing unit. Because of the desire to reduce power, each digital signal processor or portions thereof can be placed in an IDLE mode according to conditions determined by the software program of the core processing unit of the digital signal processor. Therefore, when the first digital signal processor has a requirement for a signal group in the second digital signal processing unit, the second digital processing unit can be in an IDLE mode. Because of this possibility, each digital signal processor has a clock control unit responsive to the internal generation of request for a transfer of a signal from the second processor for generating and applying a control signal to the direct memory access controller of the second digital processor. The application of the control signal to the second digital signal processor insures that the second digital signal processor is active and can respond to the request of the signal groups.

In the preferred embodiment, the control signal is applied to the direct memory access controller of the second digital signal processor. The clock control unit of the direct memory access controller applies a second control signal to the core processing unit. The second control signal enables apparatus distributing clock signals through the core processing unit of the second digital signal processor as well as other portion of the digital signal processor.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A digital signal processing unit, comprising:
   a first and a second digital signal processor, the digital processors exchanging signal groups there between without the signal groups leaving the digital signal processing unit, the first and the second digital signal processors each including:
   a core processing unit,
   a memory unit for storing signal groups,
   a serial port for exchanging signal groups with non-digital signal processing unit components, and
   a direct memory access controller, the direct memory access controller in the first digital signal processor activating the second digital signal processor from an IDLE mode when the first digital signal processor requires a signal group stored in the second digital signal processor.

2. The digital signal processing unit as recited in claim 1 wherein the direct memory controllers of the first and second digital signal processors further include apparatus for generating a first control signal when the digital signal processor requests signal groups to be transferred from the memory unit of the second digital signal processor.

3. The digital signal processing unit as recited in claim 2 wherein the direct memory access controllers of the first and second digital signal processors include apparatus responsive to the first control signal from the other digital signal processor requesting the signal groups, the first control signal causing the digital signal processor receiving the first control signal to remove the digital signal processor from an IDLE mode of operation.

4. The digital signal processing unit as recited in claim 3 further comprising a conducting path between each direct memory access controller, the conducting path transmitting the first control signal between the direct memory access controller in the first digital signal processor and the direct memory access controller in the second digital processor.

5. The digital signal processing unit as recited in claim 4 wherein application of the first control signal to a direct memory access unit results in the direct memory access controller applying a second control signal to the core processing unit, the second control signal resulting in a distribution of clock signals in the core processing unit.

6. The digital signal processing unit as recited in claim 1 wherein clock signals are not distributed in the IDLE mode.

7. In a digital signal processing unit having a plurality of digital signal processors, a method of transferring signal groups between a first and a second digital signal processor, the method comprising:
   when the first digital signal requires a signal group stored in the second digital signal processor, generating a control signal in the direct memory access controller of the first digital signal processor;
   applying the control signal to the direct memory access unit of the second digital signal processor; and
   when the second digital signal processor is in an IDLE mode, providing a transition to an ACTIVE mode as a result of the application of the first control signal.

8. The method as recited in claim 7 wherein application of the first control signal to the direct memory access controller results in a second control signal being applied to the core processing unit.

9. The method as recited in claim 7 further comprising the step of not distributing clock signals in the IDLE mode.

10. In a digital signal processing unit having a plurality of digital signal processors, the digital signal processors each having an ACTIVE mode and an IDLE mode, apparatus providing that a first digital signal processor can change a second digital signal processor from an IDLE mode to an ACTIVE mode, the apparatus comprising:
    a first clock control circuit in the direct memory access controller of the first digital signal processor generating first control signal in response to a predetermined condition;
    a second clock control circuit in the direct memory access controller of the second digital signal processor responsive to the first control signal for changing the second digital signal processor from an IDLE mode to an ACTIVE mode; and
    a conducting path from the first clock control circuit to the second clock control circuit for carrying the first control signal.

11. The digital signal processing unit as recited in claim 10 wherein the second clock control circuit generates a second control signal in response to the first control signal, the second control signal being applied to the a clock control unit of the core processing unit, the application of the second control signal to the core processing unit results in a clock signal being distributed in the core processing unit.

12. The digital signal processing unit as recited in claim 10 wherein clock signals are not distributed in the IDLE mode.

* * * * *